United States Patent

[11] 3,571,489

| [72] | Inventor | Edgar B. Coale |
| | | Philadelphia, Pa. |
| [21] | Appl. No. | 604,233 |
| [22] | Filed | Dec. 23, 1966 |
| [45] | Patented | Mar. 16, 1971 |
| [73] | Assignee | Max Levy & Company, Inc. |
| | | Philadelphia, Pa. |

[54] TRANSPARENT SUBSTRATE HAVING GRADED OPTICAL DENSITY CONDUCTORS THEREON
8 Claims, 40 Drawing Figs.

[52] U.S. Cl..................................................... 174/68.5,
95/73, 350/205, 350/314, 29/625, 338/308,
219/522, 156/3, 117/212, 174/35, 250/108,
313/108, 313/75, 313/92, 250/71

[51] Int. Cl..................................................... H05k 1/02

[50] Field of Search........................................... 174/68.5,
35.4; 117/215, 217, 212; 95/73, 81; 350/314, 205
(Spatial Filtering Digest), 13; 338/307—309, 311;
219/203, 522, 547; 156/3; 29/625—627; 250/108;
313/108.1

[56] References Cited
UNITED STATES PATENTS

| 2,356,694 | 8/1944 | Potter | 350/205UX |
| 2,384,578 | 9/1945 | Turner | 350/205X |
| 2,932,710 | 4/1960 | Coale et al. | 219/547 |
| 3,045,530 | 7/1962 | Tsujiuchi..88/(Spatial Filtering Digest) |

*Primary Examiner*—Darrell L. Clay
*Attorney*—William Steell Jackson and Sons

ABSTRACT: Electrical conductors in an array which are present in transparent insulating material such as glass and transparent plastic cause diffraction which interferes with viewing an image. By grading the optical density of the conductors from a maximum near the center to a minimum remote from the center of each conductor, diffraction is markedly reduced.

Patented March 16, 1971
3,571,489
6 Sheets-Sheet 1
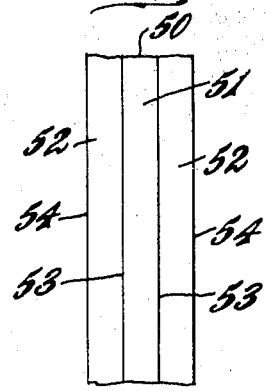
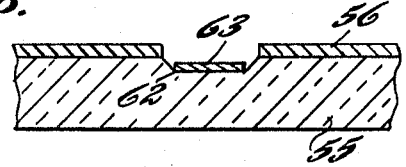
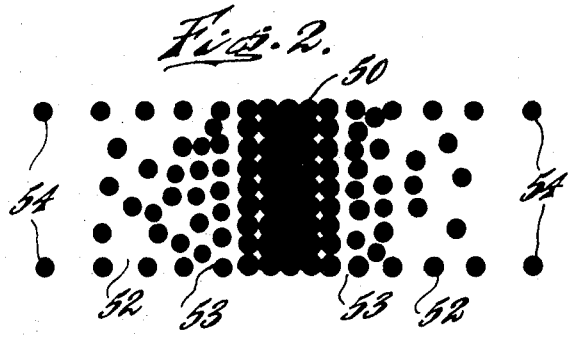
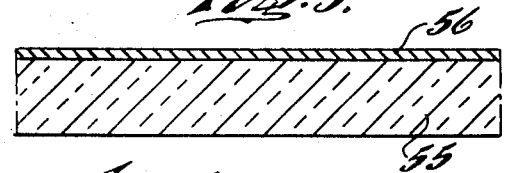
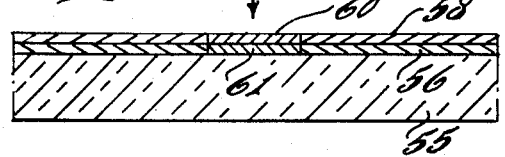
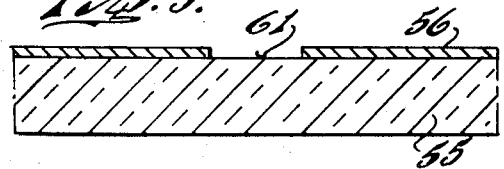
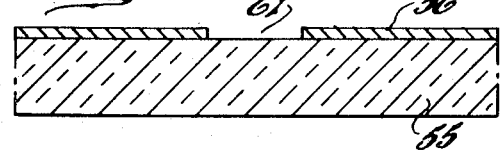
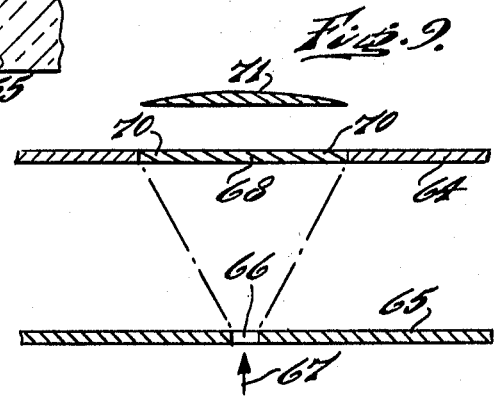
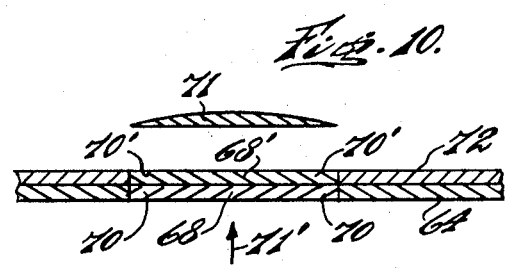
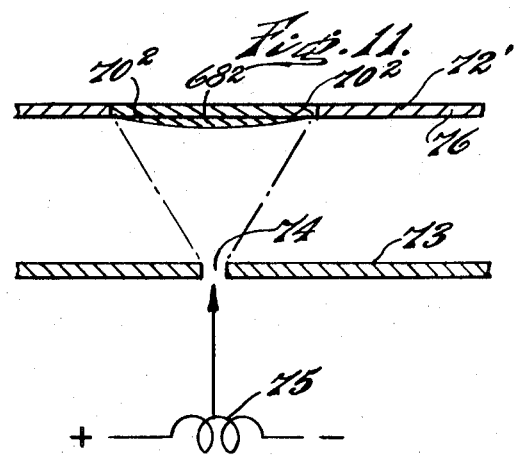
INVENTOR.
Edgar B. Coate
BY
ATTORNEYS Patented March 16, 1971 3,571,489
6 Sheets-Sheet 2
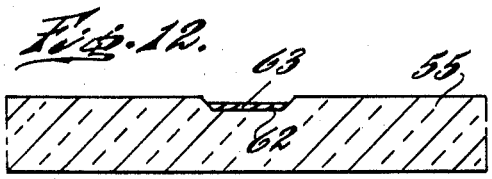
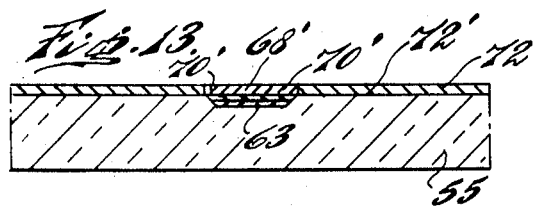
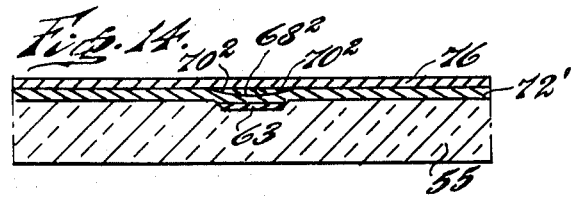
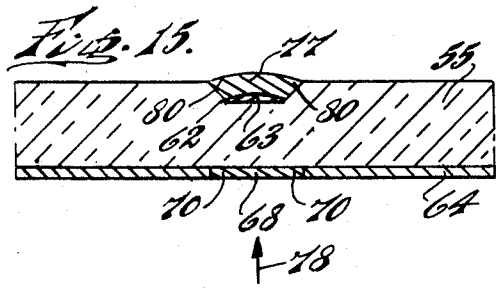
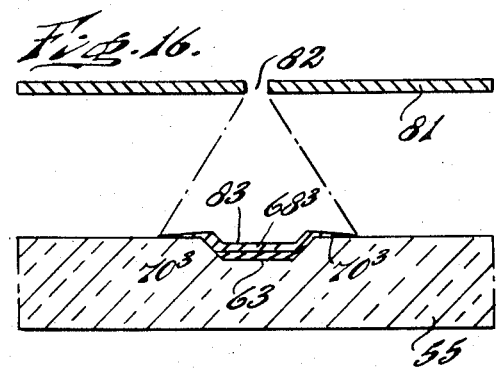
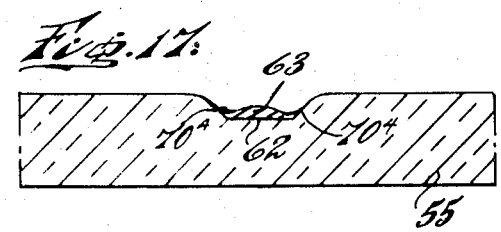
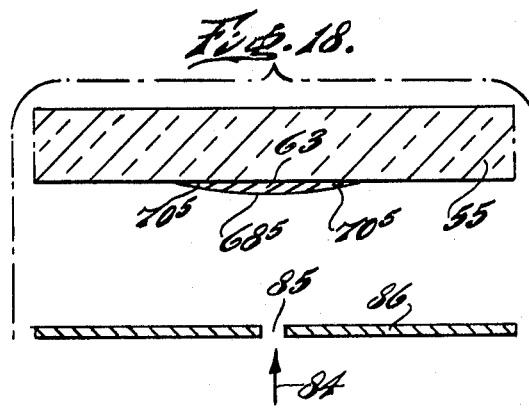
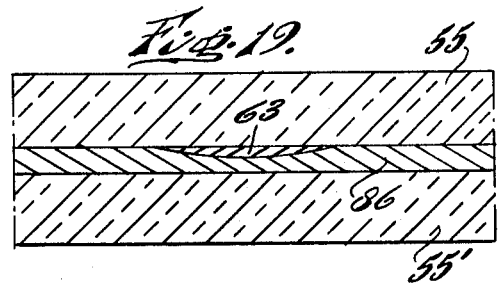
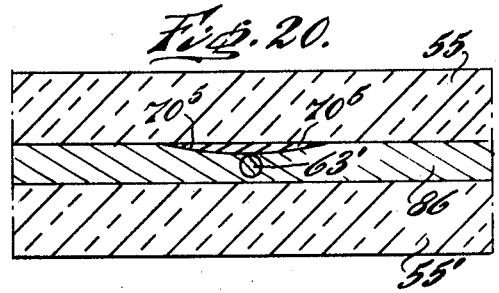
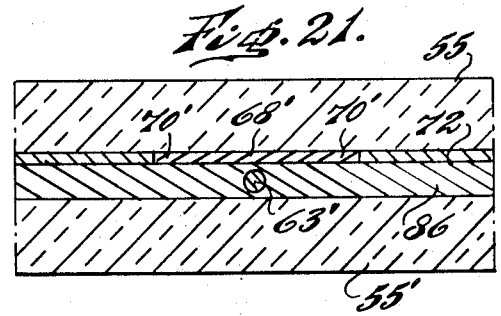
INVENTOR.
Edgar B. Coate
BY
ATTORNEYS Patented March 16, 1971
3,571,489
6 Sheets-Sheet 3
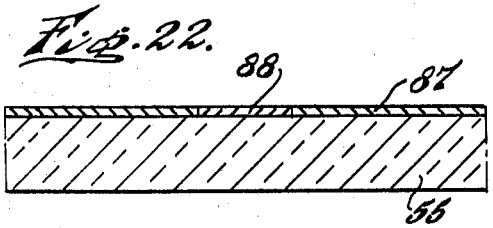
Fig.22.
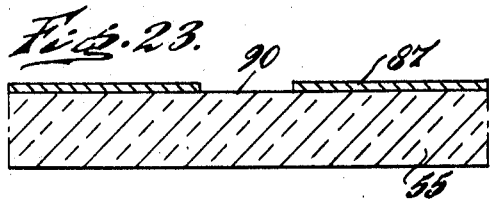
Fig.23.
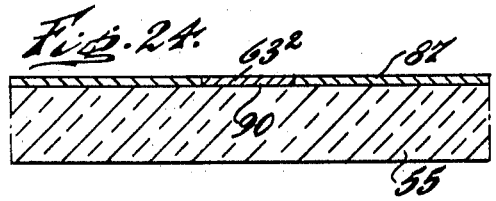
Fig.24.
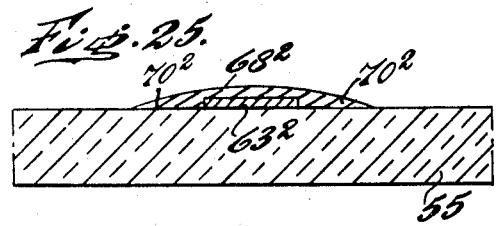
Fig.25.
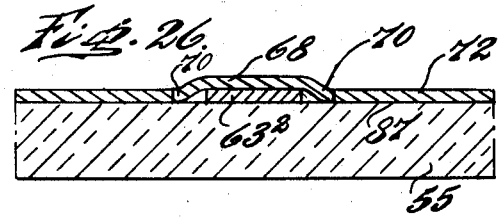
Fig.26.
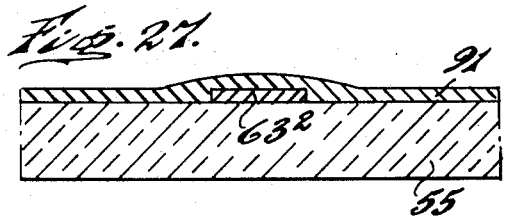
Fig.27.
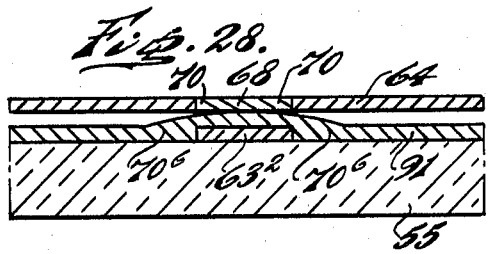
Fig.28.
Fig.29.
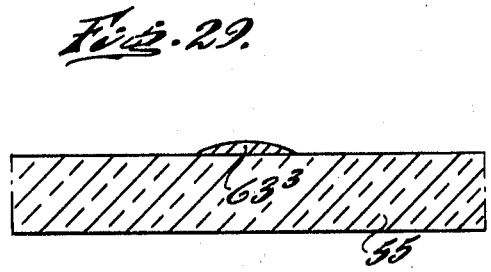
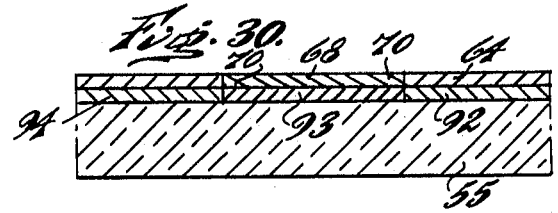
Fig.30.
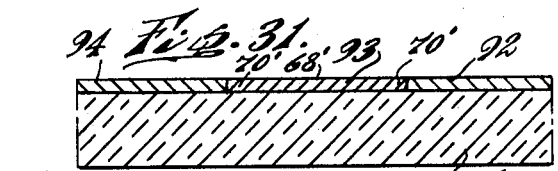
Fig.31.
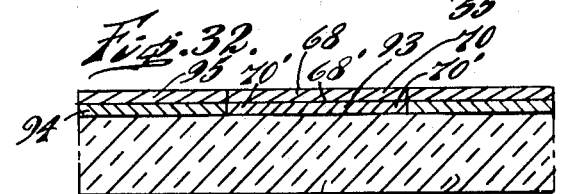
Fig.32.
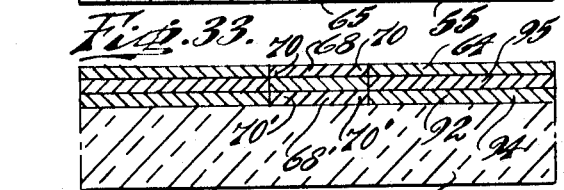
Fig.33.
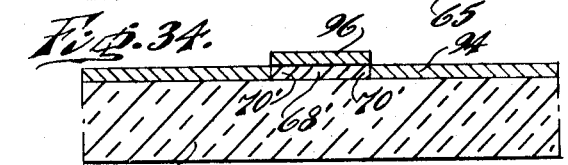
Fig.34.
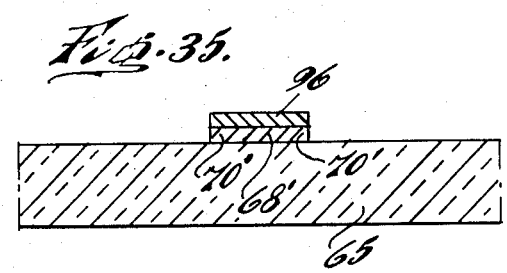
Fig.35.
INVENTOR.
Edgar B. Coate
BY
ATTORNEYS

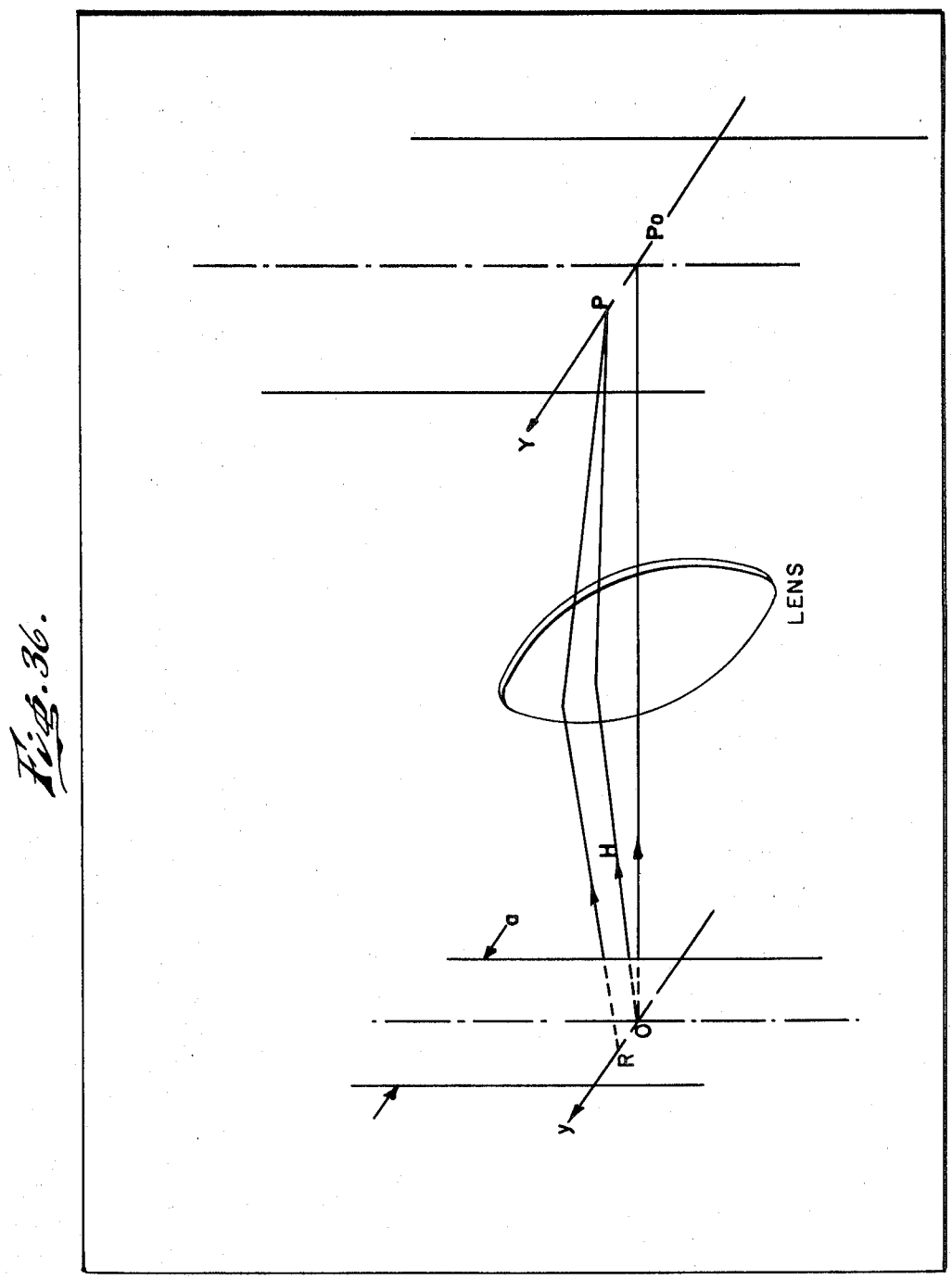

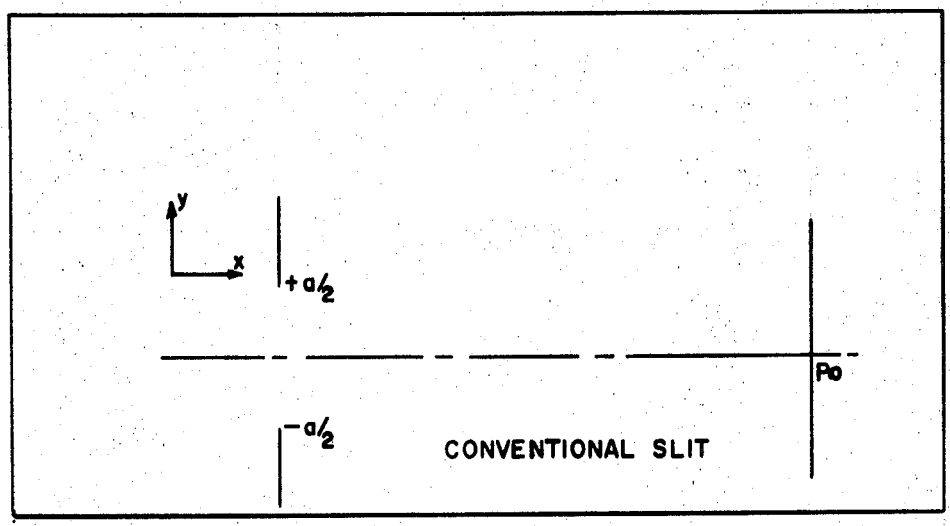
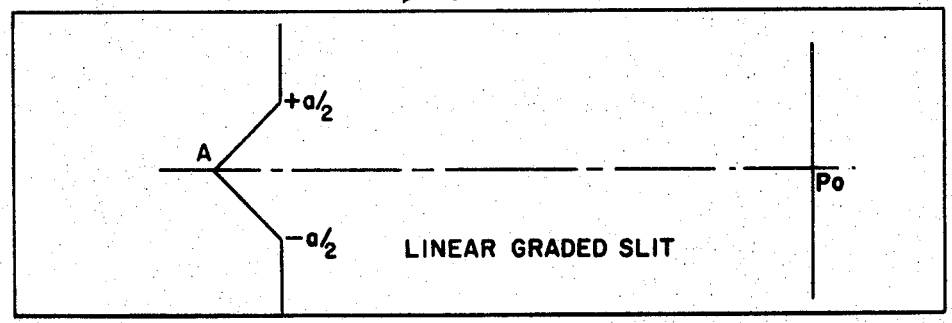
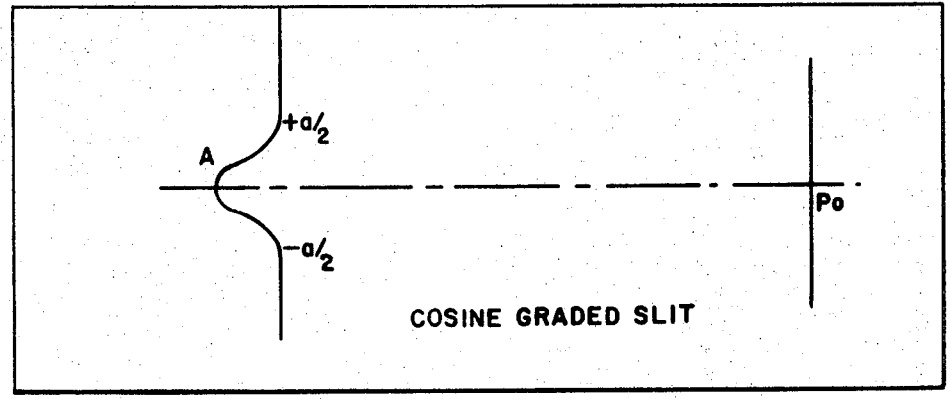

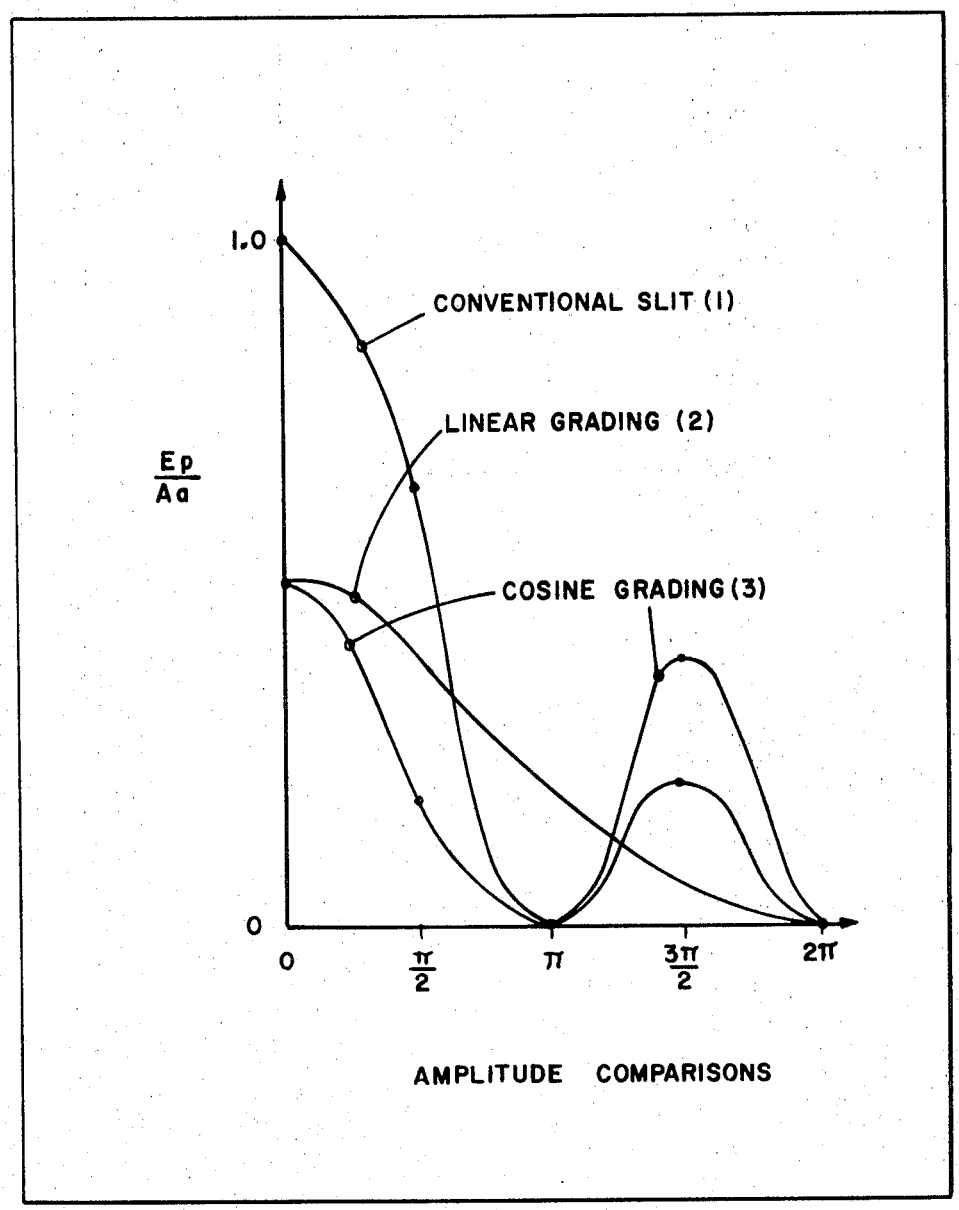

TRANSPARENT SUBSTRATE HAVING GRADED OPTICAL DENSITY CONDUCTORS THEREON

DISCLOSURE

The present application is a further development of the subject matter of Edgar B. Coale and Lionel F. Levy U.S. Pat. No. 2,932,710 for Construction In Electrically Conducting Transparent Panel. This is incorporated by reference.

The present invention relates to minimizing diffraction in transparent insulating material provided with electrical conductors.

A purpose of the invention is to restrict loss in definition of an image due to diffraction when looking through a transparent insulating material such as glass or plastic provided with an array of conductors having discrete edges by substituting therefor an array of conductors which have no discrete edges.

A further purpose is to greatly reduce the diffraction of an array of conductors in a transparent panel such as a window by grading the optical density of the conductors from the center so that no finite edge is created.

Further purposes appear in the specification and in the claims.

In the drawings I have chosen to illustrate a few of the numerous embodiments in which the invention may appear, selecting the forms shown from the standpoints of convenience in illustration, satisfactory operation, and clear demonstration of the principles involved.

FIG. 1 is a diagram looking towards an array of conductors in a transparent electrically insulating panel showing in plan view a preferred conductor and illustrating zones of different optical density of such conductor.

FIG. 2 is a diagram similar to FIG. 1 but to much enlarged scale, showing the creation of the zones of different optical densities by dots which may be dots on a photographic film or the like. FIG. 2 may be an optical modifier to be used in front of or behind a much narrower conductor.

FIGS. 3 to 14 are diagrammatic sections transverse to the plane of the panel, showing the preferred method of producing the preferred conductor shown in FIG. 1.

FIG. 3 shows in transverse section, a transparent panel on which a photoresist has been applied.

FIG. 4 is a view similar to FIG. 3, showing the making of a contact print to the photoresist.

FIG. 5 shows in transverse section a developed print in the photoresist.

FIG. 6 shows in transverse section a less desirable embodiment in which a line is incised in the resist.

FIG. 7 shows in transverse section an etched recess or channel in the substrate made by etching through the resist of FIG. 5 or FIG. 6.

FIG. 8 shows in transverse section a conductor deposited in the recess or channel of FIG. 7.

FIG. 9 illustrates in transverse section the making of an optical master mask for reducing diffraction of the conductor in FIG. 8, the optical gradation being also shown in a diagram in this FIG. FIG. 10 illustrates in transverse section contact printing of the master mask produced in FIG. 9 to make a modifier to eliminate diffraction in conductors as shown in FIG. 8.

FIG. 11 illustrates in transverse section a different and less desirable technique for producing a modifier by evaporation for reducing diffraction on conductors in FIG. 8.

FIG. 12 shows in transverse section a substrate and conductor of FIG. 8 with the resist removed.

FIG. 13 shows in transverse section the substrate and conductor of FIG. 8 with the resist removed as in FIG. 12, to which the photomodifier produced in FIG. 10 has been cemented. This is believed to be the most desirable embodiment of the invention and will in many cases be made into a suitable sandwich by using a binder adhesive to join it to another transparent panel.

FIG. 14 shows a transverse section the cementing of a modifier to a substrate provided with a conductor, the modifier being made by evaporation, as shown in FIG. 11.

FIG. 15 shows in transverse section the production of the contact printing of a reverse resist by a mask applied to the combination of the substrate and the conductor.

FIG. 16 shows in transverse section the vacuum deposited of a modifier directly on the conductor and in the recess as well as adjoining the recess to reduce diffraction.

FIG. 17 shows in transverse section the polishing of the conductor itself to eliminate finite edges and reduce diffraction.

FIG. 18 shows in transverse section the formation of a graded deposit directly on the substrate so as to create a conductor having minimum diffraction.

FIG. 19 shows in transverse section a sandwich of transparent electrically insulating sheets with the conductor of FIG. 18 joined by a sandwich binder or adhesive.

FIG. 20 shows in transverse section the use of a deposit of graded density as shown in FIG. 18 to reduce diffraction from a wire which is buried in the sandwich binder or adhesive.

FIG. 21 shows in transverse section the combination of a photomodifier as produced in FIG. 10 with a wire placed in the area occupied by the sandwich binder or adhesive, the photomodifier reducing the diffraction.

FIG. 22 shows in transverse section a substrate having a photoresist deposited thereon and contact printed to create a line where a conductor will be deposited.

FIG. 23 shows in transverse section the developed photoresist and substrate of FIG. 22.

FIG. 24 illustrates the structure of FIG. 23 in transverse section, the conductor having been deposited directly on the substrate by chemical mirror deposition as well known in the art, or by vacuum deposition as well known in the art.

FIG. 25 shows in transverse section the result of vacuum deposition of a modifier on the surface of the conductor after the developed resist is removed, using the technique as shown in FIG. 11.

FIG. 26 shows in transverse section cementing of a photomodifier as produced in FIG. 10 on the surface of the conductor and the resist.

FIG. 27 shows in transverse section a substrate having a conductor deposited as in FIG. 24, with the resist shown in FIG. 24 removed and another photoresist applied over the conductor and the substrate.

FIG. 28 shows in transverse section the contact printing of the photoresist shown in FIG. 27 through a photomask as shown in FIGS. 9 and 10 so as to permit etching away of the conductor at the edges.

FIG. 29 shows in transverse section the result of etching away the conductor with a suitable acid through the developed photoresist so as to provide edges of low optical density.

FIG. 30 shows in transverse section a photosensitive film on a film substrate being contact printed by a mask of graded optical density as shown in FIGS. 9 and 10. A glass substrate is shown which will optionally be a film base.

FIG. 31 shows in transverse section the result of exposing the photosensitive layer in FIG. 30 through a mask which has relatively opaque areas where conductors are to be located, grading remote from the center to lower optical density, and developing the photosensitive layer and treating it according to the procedure of Blake and Strange so as to allow silver to migrate to the surface of the photosensitized film to form a conductor having high optical density at the center and graded optical density toward the edges.

FIG. 32 is a view similar to FIG. 31, showing the substrate and photographic film having electrically conducting silver areas and also nonconducting silver areas, which has been coated with a positive resist such as Shipley.

FIG. 33 shows contact printing of the resist applied in FIG. 32 through the photomask which has been reregistered in the precise position which it formerly had.

FIG. 34 shows the result of developing the positive resist of FIG. 33 so that it covers and protects the conductive silver areas but has been removed from the nonconductive silver areas. FIG. 35 shows the result after treating the photographic film suitably with a reducer so as to remove the nonconductive developed silver areas while leaving the conductive silver layers.

These views are diagrammatic in the sense that the action of removal of nonconductive silver area will extend in from the edge to create reduced optical density remote from the center.

FIG. 36 shows the geometry of light transmission through a slit and a lens to an image plane, in a diagram useful in understanding the mathematical development.

FIG. 37 is a diagram showing the relation of a conventional slit to an image plane for study purposes, in order to aid in understanding the mathematical development.

FIG. 38 is a diagram showing the relation of a slit having linear graded increasing optical density from an edge in relation to the image plane and aiding in understanding mathematical development.

FIG. 39 is a diagram showing a slit in which the optical density reduces from the center outwardly according to a cosine law, aiding in understanding the mathematical development.

FIG. 40 is a series of curves showing comparisons of amplitude for the various slits under consideration, plotting as ordinate $E_p/A\alpha$ and plotting as abscissa variations in the term $\alpha$.

In the drawings like numerals refer to like parts throughout.

Electrically conductive transparent panels which have in them an array of discrete conductors embedded in or adjacent to a transparent substrate have been limited in utility because of a serious optical defect. This defect is the result of diffraction, which divides a beam of light into component spectral wavelengths by impinging the beam either by transmission or reflection on an edge or series of edges which because of their adjacency and period act as individual light sources from which emerge component wavelengths of light dispersed as a function of their wavelengths.

Diffraction effects occur whenever discrete edges interfere with the passage of light and they cause the light to produce chromatic plumes when viewed normal to the plane of an array. The result is degradation of a visual image seen through the panel. Where light sources such as headlights, light bulbs, and reflections from bright or mirrored surfaces are used, these plumes containing visual spectra are repeated as a function of frequency of the array and with broad reflection sources they produce multiplication of the observed image. This diffraction effect is present in all prior art transparent panels having lined or wired arrays and invariably causes loss of image resolution.

With panels having numerous small conductors as in said Coale and Levy U.S. Pat. No. 2,932,710, the frequency of the edges causes a particularly objectionable loss in image resolution, since the wires in the conductive arrays are closely spaced so as to render them unresolvable to the unaided human eye with 20-20 vision at a distance of 18 inches or more. In the above panels the great advantage gained by spacing the conductors so closely as to make them substantially invisible is to a large extent nullified due to degrading of the resolution of the observed image.

It is well known that Fraunhofer diffraction of light passing through a long narrow slit produces a fringe pattern of light intensity upon a viewing plane. This is caused by the phase differential in light arriving at the viewing plane from opposite sides of the slit.

DEFINITION OF TERMS

The following terms are used having the following meanings in the following development:

A = peak amplitude of light wave $\alpha = \dfrac{\pi \gamma_y a}{\lambda}$ $a$ = slit width
$y$ = cos angle ROH (see FIG. 36)
E = amplitude of optical disturbance on viewing plane
$e$ = base of natural logarithms
I = intensity $i = \sqrt{-1}$
$\lambda$ = wavelength of light wave
$P_o$ = position on axis in image plane
$P$ = any other position on image plane
$p$ = constant
= arbitrary phase angle
$\pi$ = 3.1416
$t$ = time
$u$ = constant
$x$ = value of transmission function for position $y$
$y$ = position of axis along the slit
$\omega$ = angular frequency of light wave
$\omega = 2\pi f$, where $f$ is frequency in cycles per second

CONVENTIONAL SLIT

Rossi, Optics (Addison-Wesley 1957) chapter 4, has developed the form of the light intensity on the viewing plane, assuming sharp slit edges and uniform slit illumination. The geometry is shown in FIG. 36. The amplitude at an off-axis point P on the viewing plane due to an off-axis point on the slit may be expressed as follows:

$$dE_s = A e^{i(\omega t - \phi)} e^{2\pi i \gamma y y/\lambda} \qquad (1)$$

The total optical amplitude at $P$ is found by integrating equation (1) over the range of slit width $+a/2$ to $-a/2$ along the $y$-axis:

$$E_P = A e^{i(\omega t - \varphi)} \int_{-a/2}^{+a/2} e^{2\pi i \gamma y/\lambda} dy \qquad (2)$$

Utilizing the substitutions:

$$\alpha = \frac{\pi \gamma y^a}{\lambda} \qquad (3)$$

$$\frac{e^{i\alpha} - e^{-i\alpha}}{2i} = \sin \alpha \qquad (4)$$

the expression for $E_P$ becomes:

$$E_{P_1} = A a \frac{\sin \alpha}{\alpha} e^{i(\omega t - \phi)} \qquad (5)$$

Since the light intensity is the amplitude squared:

$$I_{P_1} = A^2 a^2 \frac{\sin^2 \alpha}{\alpha^2} \qquad (6)$$

which is physically realized as the familiar diffraction pattern due to a point source viewed through a slit. The term $(\sin \alpha)/\alpha$ in equation (5) is shown in FIG. 40 as curve 1.

In the present invention the array of conductors having discrete edges is replaced by an array of conductors having no discrete edges. The optical density is reduced according to a random or ordered pattern from a maximum at or about the center of the conductor, in a direction remote from the center at both sides so that observable diffraction effects are reduced.

The following formulas explain the manner in which the gradation of optical density may function:

SLITS OF THE PRESENT INVENTION

The cyclic or fringe pattern presentation on the viewing plane is often qualitatively regarded as resulting from sharp edge slit effects.

Consideration of equations (1) to (6) indicates that this might be regarded as:
a. phase interference across the slit; and
b. abrupt boundary conditions (slit edges).

In the light amplitude $A$ across the slit is modified by controlled slit transmission in the $Y$-axis, advantages are obtained particularly in viewing point sources.

Consider first the modifications of slit transmission in the $y$-axis to a linear transition in opacity as indicated in FIG. 38 where $$x = \frac{2A}{a}y + A \Big|_{-a/2}^{0} \tag{7a}$$

$$x = -\frac{2A}{a}y + A \Big|_{0}^{+a/2} \tag{7b}$$

Integration of the form:

$$\int mye^{2\pi i\gamma y/\lambda} \tag{8}$$

where: $m = \frac{2A}{a}$ and $-\frac{2A}{a}$ is now necessary. Using standard integration forms, the result is $$E_{P_2} = Aa\frac{(1-\cos\alpha)}{\alpha^2} \tag{9}$$

Curve 2 of FIG. 40 shows the plotted form of the $(1-\cos\alpha)/\alpha^2$ argument.

If a smooth grading at the edge having a cosine form as shown in FIG. 39 is used, the transmission is given by $$x = \frac{A}{2}\left(1 + \cos\frac{2\pi y}{a}\right)\Big|_{-a/2}^{+a/2} \tag{10}$$

The integration takes the form:

$$E_{P_3} = \frac{A}{2}\int_{-a/2}^{a/2}\left(1 + \cos\frac{2\pi y}{a}\right)e^{2\pi i\gamma y/\lambda}dy \tag{11}$$

$$= \frac{A}{2}\left[\int_{-a/2}^{a/2} e^{2\pi i\gamma y/\lambda}dy + \int_{-a/2}^{a/2} e^{2\pi i\gamma y/\lambda}\cos\frac{2\pi y/a}{}dy\right] \tag{12}$$

The first integration is that of the conventional slit:

$$a\frac{\sin\alpha}{\alpha} \tag{13}$$

while the second may be consistently integrated using the definition of $\alpha$ in equation (3) and the form:

$$\int e^{ux}\cos px\,dx = \frac{e^{ux}(u\cos px + p\sin px)}{u^2 + p^2} \tag{14}$$

which results in simply:

$$-a\sin\alpha \tag{15}$$

Therefore, $$E_{P_3} = \frac{Aa}{2}\left(\frac{\sin\alpha}{\alpha} - \sin\alpha\right) \tag{16}$$

This results in curve 3 of FIG. 40.

Further inspection of equation (2) shows that the insertion of integration limits $\pm a/2$ unavoidably results in two exponential terms, one in $e^{+i}$ and the other $e^{-i}$. Reference to equation (4) and the similar cosine identity suggests the impossibility of total avoidance of a trigometric form for $E_P$ (and hence $I_P$) regardless of the choice of $A=f(y)$ through slit grading. Considerable reduction in the brightness of other than the zero-order central fringe, however, is possible as shown in $E_{P_2}$ The reduction of diffraction effects is great enough to make the transparent panels of the invention useful for a wide variety of purposes for which it is necessary to see with clear image resolution. By the invention the observable diffraction effects can be reduced to less than 5 percent of those present in a prior art array having discrete conductor edges.

Thus the light passes through transparent portions of the panel without any optically functional edge between individual conductors.

In looking at a point source of light through one of the panels of the present invention it is noted that notwithstanding the presence of conductors there is a dramatic reduction in the diffraction.

It will be understood that the conductors, as in the Coale and Levy patent aforesaid, can be connected electrically in parallel or in series, or in series parallel, through suitable contacts or headers as desired. The conductors can also be connected in groups as elements in a capacitor.

The transparent substrate in the invention will in many cases be glass, or a transparent plastic such as methyl methacrylate, like Plexiglas or Lucite, or polyvinylbutyral, cellulose acetate or a polyester such as Mylar. The substrate will suitably be connected to adjacent transparent lamina, which may be glass or transparent plastic, by a sandwich adhesive or binder, which conveniently may be polyvinylbutyral or other suitable transparent plastic adhesive.

As explained more in detail later, the conductors forming an array may be placed in grooves or recesses in the transparent substrate, or may be placed in or on the sandwich adhesive or binder that may be deposited on the substrate as desired. While the conductors may suitably be small wrought wires, they will preferably be elongated thin deposits of an electrically conducting metal, suitably of silver, gold or copper.

From the standpoint of the broadest aspect of the present invention, the concept of reducing diffraction will apply whether or not particular conductor diameters and particular conductor spacings are employed. From the standpoint, however, of a specialized aspect of the invention, in which the conductors are substantially invisible in the transparent panel, the individual conductors must be small enough in width and their spacing must be such that they are invisible to the eye of a person having normal (20–20) vision at a distance of 18 inches or greater. For this purpose as explained in the Coale and Levy patent aforesaid, the conductors may be as fine as 0.0001 to 0.0009 inch in the direction parallel to the plane of the panel and they may be as thin as 0.0001 to 0.0003 inch in the direction transverse to the plane of the panel. Also, from this latter standpoint the number of conductors may vary between 50 and 250 or more conductors per inch.

Because of the fineness of the conductors, it will be evident that it is decidedly preferable to deposit them or generate them in situ rather than to lay any previously mentioned wrought wires.

From a broader aspect of the invention, it will be evident that advantage is obtained by reducing diffraction notwithstanding that the conductors cover a substantial part of the area of the transparent panel. For superior results, however, by rendering the conductors substantially invisible and providing only limited obstruction to light, it will be evident that there is an advantage in limiting the portion of the area of the transparent panel which is obscured by the conductors to not more than about 25 percent and preferably to between 0.5 and 10 percent.

The present invention is not limited to the particular manner in which the conductors are placed in the panel, although special advantages exist in certain techniques. Various possible ways of placing the conductors in the panel are discussed as follows:

1. Conductive material in grooves in the substrate. There are various ways of forming grooves in the substrate and placing conductive material therein which will conform to the principles of the invention:

a. Grooves may be formed in the substrate as by depositing a resist and scribing or photoreproducing lines in the resist, thus removing the resist along the line, and etching the substrate through the resist. It is then possible to produce conductors in the grooves which have a varying optical density from the center toward the outside, by techniques such as vacuum depositing a metal having varying optical density, exposing a photographic emulsion which creates a conductive silver layer through a mask of varying optical density or depositing a conductor of uniform optical density, depositing a photoresist on it, exposing the photoresist through a mask of varying optical density, developing the photoresist and then etching away metal from the conductor near the edges to reduce the optical density.

b. Deposition of material of graded density in a groove.

Vacuum deposition can be conducted in a manner which will deposit material of maximum optical density in the center of the groove and deposit material of reduced optical density toward the outsides of the groove. This can be done by conducting the evaporation through a series of slits, so that the deposition is most dense opposite the centers of the slits and less dense on either side thereof.

It will be evident that vacuum deposition tends to follow a line trajectory except where it is diffracted by the wall of the slit. Any one of a variety of metals can be vacuum deposited although there are advantages in employing such metals as chromium or Inconel at vacuums of the order of 5 times $10^{15}$ Torr.

c. A conductor can be deposited in each groove and then its thickness can be reduced by polishing or lapping at the points remote from the center so that it is attenuated enough to be of low optical density. It will be evident of course that many metals form thin deposits which are transparent, and silver and gold lend themselves particularly to such techniques. A suitable abrasive for attenuating the edges of the deposited conductor is finely divided cerium oxide.

2. Conductors can be deposited adjacent to the substrate, and they can be overlaid with a modifier which has an edge of graded optical density. The modifier can be an actual deposit as a vacuum-deposited film or it can be a photographic film which serves to provide the variant optical density remote from the center 1. Conductors can be deposited on the substrate or the sandwich binder as by chemical mirroring or vacuum deposition. Elimination of the edge to form graded optical density can be accomplished as by depositing a resist and exposing the resist through a mask, developing the resist and etching away the edge of the conductor, or by vacuum deposit and overlay which will act as a modifier and create a line having graded optical density. It should be kept in mind that where desired the resist can be a reverse resist which is rendered insoluble where the light does not strike it and becomes more soluble where the light strikes it. Suitable material of this sort widely known in chemical milling is called Shipley AZ-340.

4. The conductors can be directly formed with graded optical density from the center by using a photographic process which renders the silver in a photographic image conductive. The photographic emulsion can be applied directly to the substrate or to the sandwich binder as desired or can be introduced in the form of a separate plastic film cemented to one or more substrates.

One such process has been developed by R. Kingsley Blake and Jack F. Strange, and described in a paper delivered May 6, 1966, at San Francisco, Calif., before the Annual Meeting of the Society of Photographic Scientists and Engineers, "A Diffusion Transfer Process Yielding a Conductive Silver Image" (summarized in Journal of Photochemical Etching for Jul. 1966).

FIGS. 1 and 2 show very diagrammatically in plan view the line, wire or other generally opaque element of an array, such as a transparent substrate, provided with a series of electrically conducting wires, only one of which is shown. In this form of the invention a wire 50 is divided into three longitudinally extending zones when viewed from a remote position at right angles to the face of the substrate.

As seen in FIG. 1 there is a center core 51 which is of substantially solid material, and therefore is substantially opaque, having an optical log density desirably of the order of 4.0 to 6.0. On each side of this center core are antidiffraction zones 52, each of which adjoining the core 51 at 53 is substantially opaque and which gradate at the outer limits 54 to very low optical log densities, desirably of the order of 0.01.

FIG. 2 shows the same subject matter as FIG. 1 in the form of discrete dots or zones which may be created for example by photographic methods to create the desired optical density. Thus there is a center core 50 where the dots are closely packed, and on each side thereof a zone 52 where the dots are closely packed at 53 adjoining the core 50 and very sparse at 54 at the lateral limits.

Various methods of producing these antidiffraction effects are illustrated.

FIGS. 3 to 16, inclusive, illustrate the creation of grooves or channels in the substrate in which wires or the like are deposited, substantially according to said Coale and Levy U.S. Pat. No. 2,932,710, and then the application of a modifier thereto, which will overcome to a major degree the difficulties caused by diffraction.

FIGS. 3 to 8 show the creation of a transparent panel provided with an array of wires or the like which may if desired conform with said patent.

Thus, I illustrate in FIG. 3 a substrate 55 which may be for example a sheet of transparent glass, or transparent plastic of any suitable character, for example methylmethacrylate, polyvinylchloride or any other suitable transparent sheet material.

This is conveniently coated with a suitable photoresist 56 which will be resistant to the etchant to be used, an example thereof being hydrofluoric acid for glass.

The substrate 55 coated with the photosensitive resist 56 is then contact printed from a remote light source 57 through a master screen 58 having discrete areas 60 which correspond to lines where it is desired to create grooves, suitable for introduction of conductors. The result after development of the resist 56 as shown in FIG. 5 is to provide spaced lines 61 of an array to be formed where the substrate 55 is exposed for etching or the like.

Instead of creating the lines 61 by a photoengraving technique as just described, the substrate can be coated with a resist 56' as shown in FIG. 6 and the lines 61 can be produced by scribing or otherwise. For glass substrates the resist 56' may be of wax.

Whether the resist and the areas to be etched are produced by incising or by photochemical techniques, as in FIGS. 5 or 6, the substrate 55 is then etched. In the case of glass an etchant such as hydrofluoric acid is used creating longitudinal recesses 62 corresponding to an array as shown in FIG. 7.

The conductors can be wrought wires which are placed in the recesses but it is much preferable to deposit conductors 63 in the recesses, as for example by using chemical silvering techniques or by employing vacuum deposition or sputtering techniques as well known, the resist 56 functioning to prevent deposition except in the recesses 62.

It will be evident that the conductors 63 need not be of silver but can be made of any other metal which can be conveniently deposited, preferably a highly conductive metal such as gold or copper.

In order to provide antidiffraction protection for each of the conductors 63, in a preferred aspect of the invention, I expose a photographic film 64 as shown in FIG. 9, through a slit forming mask 65 providing a number of suitably spaced slits 66 which pass light from a remote light source 67. Light passing through the slits illuminates an area 68 directly opposite the slit to produce high density and is diffracted progressively to illuminate outlying areas 70 of progressively lower optical density, the distribution of optical density in the photographic film 64 being shown by the diagram 71 which is relatively high in the center and relatively low toward the edges.

Thus, as a result the combined exposed areas 68 and 70 will be like the areas shown in FIGS. 1 and 2 of high optical density in the center and of low optical density at points remote from the center.

The master film 64 which has a large number of areas 68 and 70 spaced as desired to correspond with an array, it then developed and later contact printed from a remote light source 71' to a modifier photographic film 72 producing an exact duplicate which has an area 68' in the center of high optical density and areas 70' at the outside of low optical density, as illustrated in FIG. 10.

A modifier 72' of similar character to that shown in FIG. 10 can be made by vacuum deposition, evaporation or electrode sputtering techniques as shown in FIG. 11 where a mask 73 provides numerous spaced slits 74 of an array and under suitable high vacuum of the order of $5 \times 10^{15}$ Torr vaporizes a suitable metal such as chromium or Inconel from an electrode 75 through which electric current is passing to project a deposit on a suitable transparent plastic film or the like 76, made for example of polyester resin such as Mylar. The deposit has maximum thickness and maximum optical density at $68^2$ opposite the slit 74 and reduces to low optical densities at remote points $70^2$. Because of the extreme thinness the outer portions $70^2$ have high light transmission relative to the central zone $68^2$.

FIG. 12 illustrates the substrate 55 of FIG. 8 having the conductor 63 deposited thereon but after removal of the resist 56. FIG. 13 shows the modifier 72 produced photographically as shown in FIG. 10 which has opposite the conductors areas of high optical density 68' and overlapping on either side thereof areas of minimum optical density 70' corresponding to each one of the conductive portions. The photomodifier 72 is conveniently adhesively affixed to the substrate as for example by a transparent adhesive such as polyvinylbutyral shown at 72'.

FIG. 14 shows the vacuum deposited modifier 76 produced in FIG. 11 which has areas $68^2$ opposite each conductor and low optical density areas $70^2$ extending laterally beyond each conductor and minimizing diffraction. The plastic 76 is adhesively bonded to the substrate.

FIG. 15 shows a modifier of the type under consideration made from a reverse photoresist 77 which is deposited in the corresponding groove 62 above the conductor 63 and is contact printed from a light source 78 through a photomask 64 of the character described in reference to FIG. 9, which has an optically dense area 68 opposite the conductor 63 and relatively less optically dense areas 70 opposite the portion of the photoresist which extends laterally beyond the conductor. Since the photoresist is of the character which produces minimum optical density where it gets the most light it will produce a gradually decreasing optical density at points remote from the center along the sides 80 thus counteracting the diffraction effect.

In some cases it is preferred instead of applying the modifier by a separate film or layer or by separate lamina as in FIGS. 13 and 14 or by a resist as in FIG. 15, to use vacuum deposition, or sputtering, to deposit the modifier as in FIG. 16. In this form a mask 81 has a series of slits 82 opposite the conductors 63 which are placed in the recesses in the substrate 55 and from a remotely placed source under high vacuum and elevated temperature as previously discussed deposits a suitable metal such as chromium or Inconel forming a deposit 83 on and in the recess, the deposit being of maximum optical density at $68^3$ opposite each slit and of minimum optical density at areas $70^3$ remote from the conductor and therefore tending to lessen the diffraction.

The thinness desired to create low optical density remote from the center can be achieved by polishing, burnishing, or lapping as in FIG. 17. In this form the conductor 63 in the recess 62 as shown in FIG. 12 has been polished or lapped with a suitable abrasive to cause thinning at the edges at $70^4$ so that the conductor itself achieves low optical density at the edges. A suitable abrasive of finely divided form for this purpose is cerium oxide. There is a tendency to spread the conductor edge by smearing the metal laterally.

In some cases it is preferable to avoid the presence of any groove or recess and for this purpose the conductor with the desired lateral variation in optical density can be deposited directly on the substrate as in FIG. 18. In this form operating at high temperature and under vacuum conditions a vapor stream of suitable metal such as silver, gold, or copper at 84 passes through a slit 85 in a mask 86 and deposits a thick layer of conductor 63 at $68^5$ opposite the slit and progressively thinner layers at $70^5$ outlying from the point opposite the slit.

In view of the fact that the conductor is in this case protruding, in making a safety glass sandwich or the like it is desirable as shown in FIG. 19 to provide an adhesive sandwich bond 86 of any suitable material such as polyvinylbutyral which is thick enough to avoid difficulty with discontinuity and permit a smooth bond with the adjoining glass or plastic layer 55'.

In some cases it is preferred to use wires 63' which are buried in or located on the sandwich adhesive bond 86. To provide the modifier, which will form areas of low optical density on either side of the wire 63', when viewed from a remote point, the modifier can be cemented directly on the substrate as in FIG. 18 or it can be cemented to the adhesive sandwich bond 86, and in either case as shown in FIG. 20 it will prevent difficulty with diffraction caused by the location of the arrangement of wires in the adhesive sandwich bond 86.

As shown in FIG. 21, a glass or plastic sandwich can be made using a photomodifier 72 cemented to the substrate 55 and produced as shown in FIG. 10 having areas of low optical density 70' on either side of each of the wires 63' of the array, the modifier film 72 being suitably cemented to the substrate 55 on one side and adhering to the adhesive sandwich bond 86 on the other side.

Forms shown in the drawings do not illustrate multisubstrate plies as shown in the patent above referred to but it will be understood that they can be used as desired.

Other techniques exist for creating antidiffraction modifiers on suitable conductors which are applied without embedding in the substrate. In FIG. 22 I show a suitable photoresist 87 applied on the substrate and being exposed through a photomask not shown to produce an area 88 which as shown in FIG. 23 is removed at 90 to provide for the location of a conductor when the resist is developed. A conductor $63^2$ (FIG. 24) is applied at each of the locations 90 by chemical mirror deposition or by vacuum deposition as desired. Modifier film $68^2$ is applied directly on the conductor $63^2$ by vacuum deposition as in FIG. 25, the modifier film being of low optical density $70^2$ at points remote from the center of the conductor.

Instead in FIG. 26 the conductor $63^2$ applied by mirroring or by vacuum deposition has cemented to it and to the adjoining resist area a photomodifier 72 produced as shown in FIG. 10.

If desired, the conductor can be etched at the edges to produce reduced optical density remote from the center. In FIG. 27 I show one of an array of conductors $63^2$ deposited directly on the substrate 55 for example by chemical mirroring or by vacuum deposition and over this a photoresist layer 91 has been applied. A photomask 64 produced as shown in FIGS. 9 and 10 having areas 68 opposite the center of the conductor (FIG. 28) of high optical density and areas 70 opposite the edges of the conductor of lower optical density is placed against the resist and contact printing is carried on through the mask to expose the resist. The mask is removed, the photoresist is exposed and developed, and then the conductor $63^2$ is etched as permitted by the mask, using a suitable etchant such as nitric acid for silver, and the result is to produce a conductor $63^3$ in FIG. 29 which is of high optical density in the center and of low optical density remote therefrom and thus is capable of lessening diffraction.

In producing photographically electrically conducting lines or the like of graded optical density remote from the middle, it is desirable to employ a silver halide lithographic photographic film which will be desirably incorporated in a plastic base, suitably of polyester, the photosensitive film and base 92 in FIG. 30 being shown adhering to a transparent substrate 55. This is contact printed through a photomask 64 (otherwise as shown in FIG. 9) to form on the lithographic-type film unexposed areas 93 which are to make the conductor and other areas 94 which are photographically exposed. After completion of contact printing as in FIG. 30, the mask 64 is removed and the photographic film layer 92 is first developed and washed, and then treated in a migrating solution (FIG. 31) to cause migration of the silver to the surface in the unexposed areas corresponding to the locations 93 where the conductor is to be located, the optical density varying from a maximum at 68′ toward the center to a minimum at 70′ remote from the center of the conductor. The developing, washing and treatment to cause migration will suitably be carried out in accordance with the Kingsley and Blake process as above described. The effect of the development and treatment to cause migration on the exposed areas 94 is to make them almost opaque but not to render them conducting.

Up to this point in the process the aforesaid photographic procedure of Kingsley and Blake can be followed.

Then the exposed and migrated photographic film is coated with a positive resist layer 95 (FIG. 32) such as Shipley above referred to and the resist is allowed to dry as well known. Then using well known reregistry techniques the photomask 64 is again applied to the photographic film (FIG. 33), bringing the areas 68 and 70 on the photomask which are to correspond to the position of a conductor in exact registry with areas 68′ and 70′ on the photographic layer 92 where a conductor is intended to be placed. While the drawing in FIG. 33 shows the photomask applied on top of the resist 95 it will be evident that exposure can be made through the back because the unexposed areas 94 while relatively opaque transmit some light.

Having exposed the resist as shown in FIG. 33, it is developed as shown in FIG. 34 to produce a resist deposit 96 on the area where the conductor is to be obtained, removing the resist from the areas where no conductor is desired. Then as shown in FIG. 35 areas 94 which were not originally exposed on the film 92 are removed by using a well-known photographic reducing agent, thus removing the dispersed silver emulsion wholly and leaving the conductors with their graded optical density. A typical photographic reducing solution to remove dispersed silver is as follows:

Cupric nitrate —75.0 grams
Potassium bromide —4.0 grams
Lactic acid (85 percent balance water) —62.4 ml.

Dilute to 1,000 ml. To make up the final reducing solution use parts by volume as follows:

Lactic acid solution as above —1 part
Hydrogen peroxide (3 percent) in water —1 part
Water —2 parts
Total —4 parts A wide variety of uses are available for transparent panels according to the invention.

One important use is for deicing or demisting of windows where maintaining an operative viewing panel under adverse ambient conditions is important, as in windshields, windows and panels of vehicles such as aircraft, automotive and marine vehicles, and in face plates, helmets and viewing panels of space suits, protective clothing, cloud chambers and the like.

The invention is also applicable in connection with creating energy fields for face plates of kinescopes, antenna areas, antistatic devices, electromagnetic optical shutters of short duration response (Kerr cells), conductive transparent dielectric panels for phototropic effects, guidance of electron beams, electroluminescent panels and information display panels which respond for example to an X-axis and also an Y-axis signal.

The invention can also be used in protective panels which are intended to protect a viewer from nuclear, electrical or other high-energy phenomena.

Another use of the invention is for transparent members employed in connection with electric heating of spaces such as buildings and the like.

It will be evident that the optical density may decrease from some point in the core of the conductor towards the undefined edge of the conductor according to any suitable law, whether arithmetically proportional to the distance from some point on the core of the conductor or geometrically proportional to such distance or otherwise, or that the decrease in optical density may be random. The purpose is to achieve an undefined edge, and the variation of optical density towards the edge can be accomplished at various rates as desired.

It will further be evident that the results achieved are edges on each conductor which cannot be precisely defined visually at any magnification. The higher the magnification, the less certainty will exist as to precisely where the boundary is. This assumes that the conductors are observed normal to the plane of the panel.

In view of my invention and disclosure, variations and modifications to meet individual whim or particular need will doubtless become evident to others skilled in the art, to obtain all or part of the benefits of my invention without copying the process and apparatus shown.

I claim:

1. A transparent panel consisting of a dielectric transparent substrate, and a matrix of electrical conductors supported in spaced adjacent relation to the substrate and extending along the substrate, each of said electrical conductors when viewed from a point normal to the panel having an optical density which varies from a maximum near the center to a minimum at points on each side remote from the center 2. A panel of claim 1, in which the conductors are embedded in the substrate.

3. A panel of claim 1, in which each of said conductors has defined edges, and a modifier superimposed on the conductors and extending laterally beyond the conductors, the modifier having edges as defined in claim 1.

4. A panel of claim 1, in which each of the conductors has boundaries which may appear discrete at low magnification but on higher magnification are shown to be nondiscrete and consist of a statistically diminishing number of particles from the conductor toward the boundary.

5. A panel of claim 1, in which the conductors laterally terminate in groups of particles in an area which transmits light.

6. A panel of claim 5, in which the particles of the boundary are randomly positioned.

7. A panel of claim 5, in which the particles of the boundary area are oriented.

8. A panel of claim 1, in which the conductors and boundary areas of low optical density consist of photographically deposited silver.